(12) United States Patent
Haraguchi et al.

(10) Patent No.: US 8,735,478 B2
(45) Date of Patent: May 27, 2014

(54) AQUEOUS COATING MATERIAL AND PAINTED ARTICLE

(75) Inventors: Shinsuke Haraguchi, Toyohashi (JP); Motomi Tanaka, Otake (JP); Junichi Nakamura, Toyohashi (JP); Daisuke Natsui, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 239 days.

(21) Appl. No.: 13/376,546

(22) PCT Filed: Jun. 8, 2010

(86) PCT No.: PCT/JP2010/003801
§ 371 (c)(1),
(2), (4) Date: Dec. 6, 2011

(87) PCT Pub. No.: WO2010/143413
PCT Pub. Date: Dec. 16, 2010

(65) Prior Publication Data
US 2012/0077911 A1 Mar. 29, 2012

(30) Foreign Application Priority Data

Jun. 8, 2009 (JP) .................................. 2009-137288
Jun. 8, 2009 (JP) .................................. 2009-137291
Nov. 18, 2009 (JP) .................................. 2009-263122
Nov. 18, 2009 (JP) .................................. 2009-263123
Mar. 19, 2010 (JP) .................................. 2010-064622

(51) Int. Cl.
C08K 5/06 (2006.01)
C08L 37/00 (2006.01)

(52) U.S. Cl.
USPC ........................................ 524/366; 524/548

(58) Field of Classification Search
USPC ....................................................... 524/366
See application file for complete search history.

(56) References Cited

U.S. PATENT DOCUMENTS

| 4,857,577 A | 8/1989 | Buter |
| 5,139,882 A | 8/1992 | Elser et al. |
| 2007/0129478 A1* | 6/2007 | Nakamura et al. ............ 524/492 |
| 2008/0178762 A1 | 7/2008 | Vasudevan |

FOREIGN PATENT DOCUMENTS

| CN | 1926208 A | 3/2007 |
| JP | 62 179551 | 8/1987 |
| JP | 8 34955 | 2/1996 |
| JP | 2801340 | 9/1998 |
| JP | 11 116885 | 4/1999 |
| JP | 2001 335721 | 12/2001 |
| JP | 2004 50064 | 2/2004 |
| JP | 2004 67749 | 3/2004 |
| JP | 2004-292686 | 10/2004 |
| JP | 2005 120165 | 5/2005 |
| JP | 2007 31648 | 2/2007 |
| JP | 2007-186616 | 7/2007 |
| JP | 2008 189884 | 8/2008 |
| JP | 2009 108187 | 5/2009 |
| JP | 2009 256569 | 11/2009 |
| JP | 2009 269972 | 11/2009 |
| JP | 2009269973 | 11/2009 |
| WO | 2005 075583 | 8/2005 |
| WO | 2009 044912 | 4/2009 |

OTHER PUBLICATIONS

International Search Report Issued Sep. 7, 2010 in PCT/JP10/03801 filed Jun. 8, 2010.
Chinese Office Action issued Jul. 16, 2013, in China Patent Application No. 201080025302.4 (with English translation).
Notification (Information Statement) issued Sep. 10, 2013 in Japanese Patent Application No. 2010-524689 (with English translation).
Werner Stöber, et al., "Controlled Growth of Monodisperse Silica Spheres in the Micron Size Range", Journal of Colloid and Interface Science, vol. 26, 1968, pp. 62-69.
Rickey D. Badley, et al., "Surface Modification of Colloidal Silica", Langmuir, 1990, vol. 6, pp. 792-801.
Yoshiko Nakahara, et al., "Control of Particle Size and Pore Volume of Silica Microsphere", Journal of the Japan Society of Colour Material vol. 61, 1988, pp. 488-493 (with English abstract).

* cited by examiner

*Primary Examiner* — Hui Chin
(74) *Attorney, Agent, or Firm* — Oblon, Spivak, McClelland, Maier & Neustadt, L.L.P.

(57) ABSTRACT

The present invention relates to an aqueous coating material containing polymer (I), colloidal silica (II), and nonionic surfactant (III) with an HLB value of 16 or more. The polymer (I) is obtained by copolymerization of monomer mixture (M) that contains 0.2 to 10% by mass of monomer (a) having two or more radically polymerizable groups. The solid content of the colloidal silica (II) is 0.1 to 20 parts by mass with respect to 100 parts by mass of the polymer (I). The content of the nonionic surfactant (III) is 0.01 to 10 parts by mass with respect to 100 parts by mass of the polymer (I). The present invention also relates to a painted article where the aqueous coating material is applied. Therefore, an aqueous coating material and a painted article capable of expressing stain resistance and weather resistance can be provided by reducing a water contact angle.

20 Claims, No Drawings

AQUEOUS COATING MATERIAL AND PAINTED ARTICLE

TECHNICAL FIELD

The present invention relates to an aqueous coating material and a painted article.

This application is a National Stage application of PCT/JP10/003801 filed Jun. 8, 2010, and claims the priory to JP2009-137288, JP2009-137291, JP2009-263122, JP2009-263123, and JP2010-064622, filed on Jun. 8, 2009, filed on Jun. 8, 2009, Nov. 18, 2009, Nov. 18, 2009, and Mar. 19, 2010, respectively.

BACKGROUND ART

In recent years, in the field of paints, conversion from organic solvent-based paints to water-based paints has been attempted from the viewpoints of environmental protection and health and safety. However, water-based paints are insufficient in coating performance of weather resistance, water resistance, and stain-resistance in comparison with organic solvent-based paints. Therefore, the development of water-based paints has been conducted for solving these problems.

For instance, Patent Literature 1 discloses a low stain aqueous coating material including an acrylic resin emulsion and colloidal silica, where the acrylic resin emulsion has a minimum film-forming temperature of 15° C. or more.

Patent Literature 2 discloses an aqueous coating material containing an aqueous emulsion and colloidal silica, where the aqueous emulsion is obtained by polymerizing hydrolyzable silyl group-containing monomers with a nonionic surfactant in an aqueous emulsion of acrylic resin having a cross-linking structure.

Patent Literature 3 discloses an aqueous coating material containing an acrylic polymer, colloidal silica, and a nonionic surfactant, where the acrylic polymer is obtained by copolymerization of monomers having two radically polymerizable groups.

CITATION LIST

Patent Literatures

Patent Literature 1: Japanese Unexamined Patent Application Publication No. 11-116885
Patent Literature 2: Japanese Unexamined Patent Application Publication No. 2004-67749
Patent Literature 3: International Publication No. WO 2005/075583

SUMMARY OF THE INVENTION

Problems to be Solved by the Invention

However, in the case of the aqueous coating material described in Patent Literature 1, a coating film obtained has insufficient weather resistance because a large amount of colloidal silica is mixed.

In the case of the aqueous coating material described in Patent Literature 2, a coating film obtained has insufficient stain resistance and weather resistance because the nonionic surfactant has low hydrophilicity (HLB value of less than 16).

In the case of the aqueous coating material described in Patent Literature 3, in the polymers that constitute the coating film, a coating film obtained has insufficient stain resistance and weather resistance because the amount of monomers having two or more radically polymerizable groups is small to be polymerized.

Solutions to the Problems

The gist of the present invention is an aqueous coating material containing polymer (I) and colloidal silica (II), and nonionic surfactant (III) with an HLB value of 16 or more, wherein the polymer (I) is a polymer obtained by copolymerization of monomer mixture (M) that contains 0.2 to 10% by mass of monomer (a) having two or more radically polymerizable groups; a solid content of the colloidal silica (II) is 0.1 to 20 parts by mass with respect to 100 parts by mass of the polymer (I); and a content of the nonionic surfactant (III) is 0.01 to 10 parts by mass with respect to 100 parts by mass of the polymer (I).

Effects of the Invention

The coating film obtained from the aqueous coating material of the present invention has excellent stain resistance, weather resistance, storage stability, and blister resistance.

DESCRIPTION OF EMBODIMENTS

The aqueous coating material of the present invention contains polymer (I), colloidal silica (II), and nonionic surfactant (III) with an HLB value of 16 or more.

The polymer (I) is a polymer obtained by copolymerization of monomer mixture (M) that contains 0.2 to 10% by mass of monomer (a) having two or more radically polymerizable groups.

When the content of the monomer (a) in the monomer mixture (M) is less than 0.2% by mass, a coating film obtained from the aqueous coating material of the present invention is insufficient in stain resistance and weather resistance.

When the content of the monomer (a) exceeds 10% by mass, a coating film obtained from the aqueous coating material of the present invention is insufficient in weather resistance.

Here, the content of the monomer (a) is preferably 0.4% by mass or more in terms of stain resistance and weather resistance, and preferably 3% by mass or less in terms of weather resistance.

Specific examples of the monomer (a) include diester compounds obtained by reacting diol and (meth)acrylic acid, such as ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,3-butylene glycol di(meth)acrylate, 1,6-hexanediol di(meth)acrylate, neopentyl glycol di(meth)acrylate, 2-hydroxy-1,3-di(meth)acryloxypropane, 2,2-bis[4-(acryloxy ethoxy)phenyl]propane, 2,2-bis[4-(methacryloxy ethoxy)phenyl]propane, 2,2-bis[4-(acryloxy polyethoxy)phenyl]propane, 2,2-bis[4-(methacryloxy polyethoxy)phenyl]propane, 2-hydroxy-1-acryloxy-3-methacryloxypropane, ethylene oxide-modified bisphenol-A di(meth)acrylate, propylene oxide-modified bisphenol-A di(meth)acrylate, ethylene oxide-modified hydrogenated bisphenol-A di(meth)acrylate, propylene oxide-modified hydrogenated bisphenol-A di(meth)acrylate, epoxy(meth)acrylate obtained by addition of hydroxyalkyl(meth)acrylate, such as hydroxy (meth)acrylate, to diglycidyl ether of bisphenol A, and polyoxyalkylenated bisphenol-A di(meth)acrylate; polyester compounds obtained by reacting a compound having three or more hydroxyl groups per molecule and (meth)acrylic acid, such as trimethylolpropane tri(meth)acrylate, tetramethylolmethane tri(meth)acrylate, tetramethylolmethane tetra(meth)acrylate, pentaerythritol tri(meth)acrylate, pentaerythritol tetra(meth)acrylate, dipentaerythritol penta(meth)acrylate, and dipentaerythritol hexa(meth)acrylate; and allyl(meth)acrylate, divinyl benzene, triallyl(iso)cyanurate, diallyl iso(tere)phthalate, diallyl isocyanurate, diallyl maleate, tris(2-acryloyloxyethylene)isocyanurate, and ε-caprolactone-modified tris(acryloxyethyl) isocyanurate.

Furthermore, the use of monomers having two or more allyl groups leads to further improvement in stain resistance, weather resistance, and blister resistance of the coating film obtained. Among them, triallyl cyanurate, triallyl isocyanurate, diallyl iso(tere)phthalate, diallyl isocyanurate, diallyl maleate and the like are preferable, and triallyl cyanurate and triallyl isocyanurate each having three allyl groups are more preferable.

The monomer (a) may be used alone, or may be used in combination of two or more.

The content of monomers other than the monomer (a) contained in the monomer mixture (M) is 90 to 99.8% by mass, and preferably 97 to 99.6% by mass. Examples of the monomers other than the monomer (a) contained in the monomer mixture (M) include alkyl(meth)acrylates having an alkyl group of 1 to 18 carbon atoms, such as methyl(meth)acrylate, ethyl(meth)acrylate, n-butyl(meth)acrylate, i-butyl(meth)acrylate, sec-butyl(meth)acrylate, t-butyl(meth)acrylate, glycidyl(meth)acrylate, cyclohexyl(meth)acrylate, 2-ethylhexyl(meth)acrylate, and stearyl(meth)acrylate; hydrolyzable silyl group-containing radically polymerizable monomers, such as γ-(meth)acryloyloxypropylmethyl dimethoxysilane and γ-(meth)acryloyloxypropyl trimethoxysilane; ethylenically unsaturated carboxylic acid monomers, such as acrylic acid, methacrylic acid, and itaconic acid; hydroxyl group-containing radically polymerizable monomers, such as 2-hydroxyethyl(meth)acrylate; hydroxy-terminated polyalkylene oxide group-containing radically polymerizable monomers, such as hydroxypolyethylene oxide mono(meth)acrylate and hydroxypolypropylene oxide mono(meth)acrylate; alkyl-terminated polyalkylene oxide group-containing radically polymerizable monomers, such as methoxypolyethylene oxide mono(meth)acrylate; oxyrane group-containing radically polymerizable monomers, such as glycidyl (meth)acrylate; (meth)acrylates having photostabilizing action, such as 1,2,2,6,6-pentamethyl-4-piperidyl (meth)acrylate and 2,2,6,6-pentamethyl-4-piperidyl(meth)acrylate; (meth)acrylates having UV absorbable component, such as 2-[2'-hydroxy-5'-(meth)acryloyloxyethylphenyl]-2H-benzotriazol; amino alkyl(meth)acrylates, such as 2-aminoethyl(meth)acrylate; amide group-containing radically polymerizable monomers, such as (meth)acryl amide; metal-containing radically polymerizable monomers, such as zinc di(meth)acrylate; other (meth)acrylic monomers, such as (meth)acrylonitrile, benzyl(meth)acrylate, isobornyl(meth)acrylate, and methoxy ethyl(meth)acrylate; aromatic vinyl monomers, such as styrene and methyl styrene; carbonyl group- and/or aldehyde group-containing ethylenically unsaturated monomers, such as acrolein, diacetone acrylamide, formyl styrol, and vinylalkyl ketone; conjugated diene monomers, such as 1,3-butadiene and isoprene; and radically polymerizable monomers, such as vinyl acetate, vinyl chloride, and ethylene.

In the present invention, furthermore, the polymer (I) may be copolymerized with the monomer mixture (M) containing 0.1 to 9% by mass of acrylic acid. In this case, the polymer (I) preferably has an average particle size of 80 to 140 nm.

The polymer (I) obtained by copolymerizing acrylic acid and, in this case, having an average particle size of 80 to 140 nm allows colloidal silica to be provided at a greater concentration at the surface of a coating film in a process of drying an aqueous coating material. As a result, the coating film obtained can be provided with improved stain resistance, weather resistance, and blister resistance.

When the content of the acrylic acid is 0.1% by mass or more, the stain resistance of the coating film can be easily improved. When the content of the acrylic acid is 9% by mass or less, the weather resistance of the coating film can be easily improved.

When the monomer mixture (M) containing 0.1 to 9% by mass of acrylic acid is copolymerized, the polymer (I) having an average particle size of 80 nm or more facilitates an improvement in weather resistance of the coating film, while the polymer having an average particle size of 140 nm or less facilitates improvements in weather resistance, blister resistance, and freeze-thaw resistance of the film. Therefore, the average particle size of the polymer (I) is more preferably 100 to 130 nm.

Here, the average particle size of the polymer (I) is determined by the cumulant analysis that calculates an average particle size by adapting a scattering intensity distribution due to fine particles detected by a dynamic light scattering method to a normal distribution. This measurement employs Fiber-optics particle analyzer, FPAR-1000, manufactured by Otsuka Electronics Co., Ltd., and computes the average particle size by an analytical process with attached software.

Preferably, furthermore, the monomer mixture (M) may contain 5 to 70% by mass of t-butyl methacrylate and/or cyclohexyl methacrylate from the viewpoint of improvement in blister resistance and weather resistance of a coating film obtained.

In the present invention, furthermore, a carbonyl group- and/or aldehyde group-containing ethylenically unsaturated monomer is preferably included in monomer component (M). Examples of the carbonyl group- and/or aldehyde group-containing ethylenically unsaturated monomer include acrolein, diacetone acrylamide, formyl styrol, vinyl methyl ketone having 4 to 7 carbon atoms, vinyl ethyl ketone, vinyl isobutyl ketone, (meth)acrylic oxyalkyl propanal, (meth)acrylamide, pivalic aldehyde, diacetone (meth)acrylate, acetonyl acrylate, and acetoacetoxyethyl(meth)acrylate.

When a paint is prepared by mixing the aqueous coating material of the present invention, which contains the polymer (I) obtained by copolymerization of the carbonyl group- and/or aldehyde group-containing ethylenically unsaturated monomer, with an organic hydrazine compound having at least two hydrazino groups in the molecule thereof (hereinafter referred to as "hydrozine compound"), a cross-linking reaction between the carbonyl group in the polymer (I) and the hydrazino group of the hydrazine compound proceeds to improve the weather resistance, strain resistance, and blister resistance of the coating film obtained.

The content of the carbonyl group- and/or aldehyde group-containing ethylenically unsaturated monomer is preferably 0.2 to 10% by mass in the monomer mixture (M).

Examples of the hydrazine compound include dicarboxylic acid dihydrazides having 2 to 15 carbon atoms, such as ethylene-1,2-dihydrazine, propene-1,3-dihydrazine, butylene-1,4-dihydrazine, oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, isophthalic acid dihydrazide, and itaconic acid dihydrazide; and compounds having hydantoin skeleton, such as 1,3-bis(hydrazinocarboethyl)-5-isopropyl hydantoin, 1,3-bis(hydrazinocarboethyl)-5-(2-methylmercaptoethyl)hydantoin, and 1-hydrazino carboethyl-3-hydrazino carboisopropyl-5-(2-methyl mercaptoethyl)hydantoin.

The hydrazine compound may be used alone, or may be used in combination of two or more. A ratio of the monomer and the hydrazine compound, (P)/(Q), is preferably 0.1 to 10, and more preferably 0.8 to 2, where (P) represents the mole number of the monomer contained in the monomer mixture (M) and (Q) represents the mole number of the hydrazino group of the hydradine compound mixed with the dispersion liquid of the polymer (I). When (P)/(Q) is 0.1 or more, a decrease in blister resistance of the coating film due to the unreacted hydrazine compound can be easily suppressed. When (P)/(Q) is 10 or less, the blocking resistance, weather resistance, stain resistance, and solvent resistance of the coating film can be improved.

According to the present invention, the monomer mixture (M) preferably includes monomer mixture (m1) that contains monomer (a) and monomer mixture (m2) that does not contain monomer (a). This polymer (I) is obtained by polymerizing the monomer mixture (m1) and then polymerizing the monomer mixture (2), and the glass transmission temperature of a polymer constituted by the monomer mixture (m2) is 20° C. or more, which is calculated from the FOX equation.

The polymer constituted by the monomer mixture (m2) and having a glass transition temperature of 20° C. or more allows an aqueous coating material to have improved storage stability.

According to the present invention, preferably, the monomer mixture (M) includes the monomer mixture (m1) that contains the monomer (a) and the monomer mixture (m2) that does not contain the monomer (a). This polymer (I) is obtained by polymerizing the monomer mixture (m1) and then polymerizing the monomer mixture (m2), and the glass transmission temperature of a polymer constituted by a monomer mixture other than the monomer (a) in the monomer mixture (m1) is 60° C. or less, which is calculated from the FOX equation.

The polymer constituted by the monomer mixture other than the monomer (a) in the monomer mixture (m1) and having a glass transition temperature of 60° C. or less allows a coating film to have improved blister resistance and weather resistance.

The term "glass transition temperature" (Tg) used herein refers to a value obtained by the FOX equation as represented by Equation (1) below with values described in Polymer Hand Book, J. Brandrup, Interscience, 1989.

$$1/(273+Tg) = \Sigma(Wi/(273+Tgi)) \tag{1}$$

In the equation, Wi represents a mass fraction of monomer i and Tgi represents Tg (° C.) of a homopolymer of monomer i.

Furthermore, the aqueous coating material of the present invention essentially contains colloidal silica (II).

The colloidal silica (II) imparts hydrophilicity to a coating film obtained from the aqueous coating material of the present invention. As a result, the coating film obtained is not only provided with improved stain resistance but also provided with improved hardness and weather resistance.

The colloidal silica (II) may be a commercially-available product, and may be prepared using water or an organic solvent as a dispersion medium.

Examples of the colloidal silica (II) include acidic aqueous colloidal silica, alkaline aqueous colloidal silica, and cationic colloidal silica.

The acidic aqueous colloidal silica may be, for example, one with a trade name: "Snowtex O" (20% $SiO_2$ in solid content, manufactured by Nissan Chemical Industries, Co., Ltd.).

The alkaline aqueous colloidal silica may be, for example, any of those with trade names: "Snowtex XS" (20% $SiO_2$ in solid content), "Snowtex NXS" (20% $SiO_2$ in solid content), "Snowtex N" (20% $SiO_2$ in solid content), "Snowtex S" (30% $SiO_2$ in solid content), and "Snowtex NS" (20% $SiO_2$ in solid content), which are manufactured by Nissan Chemical Industries, Co., Ltd.

The cationic colloidal silica may be, for example, "Snowtex AK" (19% $SiO_2$ in solid content, manufactured by Nissan Chemical Industries, Co., Ltd.).

Only one of these kinds of colloidal silica may be used, or two or more of them may be used in combination.

The content of the colloidal silica (II) in an aqueous coating material is 0.1 to 20 parts by mass, preferably 0.5 to 18 parts by mass, and more preferably 1 to 10 parts by mass in solid content with respect to 100 parts by mass of the polymer (I). When the content of the colloidal silica (II) is 0.1 parts by mass or more, the coating film obtained has improved stain resistance. In addition, when the content of the colloidal silica (II) is 20 parts by mass or less, the coating film obtained has improved stain resistance without decrease in transparency, weather resistance, blister resistance, and freeze-thaw resistance.

Furthermore, the average particle size of the colloidal silica (II) is preferably 1 to 60 nm, more preferably less than 40 nm, and still more preferably less than 20 nm. When the average particle size is 60 nm or less, the colloidal silica (II) is provided at a greater concentration at the surface layer of a coating film in a process of drying an aqueous coating material, and stain resistance of the coating film can be easily improved.

The aqueous coating material of the present invention still needs to include nonionic surfactant (III) with an HLB value of 16 or more. The stain resistance of a coating film obtained can be improved by containing the nonionic surfactant (III) with an HLB value of 16 or more.

Here, the term "HLB" stands for hydrophile-lipophile balance, and the value thereof is calculated from Equation (2) below by the Griffin method (revised edition of "New Introduction of Surfactants", p 128,).

$$\text{HLB of nonionic surfactant} = (\text{molecular weight of hydrophilic group/molecular weight of surfactant}) \times 20 \tag{2}$$

The HLB value of the nonionic surfactant (III) is preferably 17 or more. The HLB value is more preferably 18 or more because the surface of the coating film obtained is provided with higher hydrophilicity.

Examples of the nonionic surfactant (III) with an HLB value of 16 or more include polyoxyalkylene alkyl ether, polyoxyalkylene alkylphenol ether, polyoxyalkylene aryl ether, polyoxyalkylene alkyl aryl ether, sorbitan derivatives, formalin condensate of polyoxyalkylene aryl ether, and formalin condensate of polyoxyalkylene alkyl aryl ether. Among them, polyoxyalkylene alkyl ether is particularly preferable.

The alkyl portion of the polyoxyalkylene alkyl ether used as the nonionic surfactant (III) may be, for example, a linear or branched alkyl group having 1 to 36 carbon atoms. In addition, the polyoxyalkylene portion of the polyoxyalkylene alkyl ether is preferably polyoxy ethylene because a coating film having excellent hydrophilicity and static electricity can be obtained in particular. In addition, the number of repetitive units of polyoxy ethylene is preferably 30 or more, and more preferably 40 or more because a coating film having excellent hydrophilicity and static electricity can be obtained in particular.

Among the nonionic surfactants of polyoxyalkylene alkyl ether, a surfactant represented by Equation (3) below is particularly preferable.

(wherein m represents 0 or a positive integer, and $R^3$ represents a linear or branched alkyl group having 1 to 36 carbon atoms).

Specific examples of the nonionic surfactant (III) represented by Equation (3) include EMULGEN 1150S-60 (trade name, manufactured by Kao Corporation, $R^3$: mainly alkyl group having 11 carbon atoms, m=50, HLB=18.5) and EMULGEN 1135S-70 (trade name, manufactured by Kao Corporation, $R^3$: mainly alkyl group having 11 carbon atoms, m=35, HLB=17.9).

The content of the nonionic surfactant (III) in an aqueous coating material is 0.01 to 10 parts by mass, preferably 0.1 to 8 parts by mass, more preferably 0.3 to 5 parts by mass, and still more preferably 0.5 to 2 parts by mass with respect to 100 parts by mass of the polymer (I). When the content of the nonionic surfactant (III) is 0.01 parts by mass or more, the stain resistance of the coating film obtained can be improved. In addition, the stability of an aqueous coating material in mixing for preparing a paint and the storage stability of the aqueous coating material can be improved. When the content of the nonionic surfactant (III) is 10 parts by mass or less, the stain resistance of the coating film, the stability of an aqueous coating material in mixing for preparing a paint, and the storage stability of the aqueous coating material can be improved without lowering the blister resistance of the coating film obtained.

The aqueous coating material of the present invention may further contain anionic surfactant (IV).

The anionic surfactant (IV) in combination with the nonionic surfactant (III) causes the colloidal silica (II) to be provided at a greater concentration at the surface of a coating film, facilitating an improvement in stain resistance of the coating film.

The anionic surfactant (IV) may be at least one of surfactants selected from the group consisting of sulfuric ester salt of polyoxyalkylene aryl ether, phosphoric ester salt of polyoxyalkylene aryl ether, sulfuric ester salt of polyoxyalkylene alkyl aryl ether, and phosphoric ester salt of polyoxyalkylene alkyl aryl ether. The sulfuric ester salts include formalin condensates.

Furthermore, the use of the anionic surfactant having a phosphoric acid structure is more preferable because the blister resistance and weather resistance of the coating film can be improved.

To produce excellent performance as a coating material, the aqueous coating material of the present invention may contain any of various pigments; various additives, such as defoaming agents, pigment dispersants, leveling agents, sag control agents, delustering agents, UV absorbers, photo-stabilizing agents, antioxidants, heat resistance improvers, slipping agents, preservatives, plasticizers, and film-forming auxiliaries; and other kinds of emulsion resins, such as polyester-based resins, polyurethane-based resins, acrylic resins, acrylic silicone-based resins, silicone-based resins, fluorine-based resins, and epoxy-based resins; water-soluble resin; viscosity control agents; and hardeners, such as melamines and isocyanates.

The film-forming auxiliaries may be those commonly used in aqueous paints, and examples thereof include linear, branched, or cyclic aliphatic alcohols having 5 to 10 carbon atoms; alcohols containing aromatic group; monoethers of (poly)ethylene glycol, (poly)propylene glycol, or the like represented by general formula, $HO-(CH_2CHXO)_p-R^4$, wherein $R^4$ represents a linear or branched alkyl group having 1 to 10 carbon atoms, X represents a hydrogen atom or a methyl group, and p represents an integer of 5 or less; (poly)ethylene glycol ether esters or (poly)propylene glycol ether esters represented by general formula, $R^5COO-(CH_2CHXO)_q-R^6$, wherein $R^5$ and $R^6$ each independently represents a linear or branched alkyl group having 1 to 10 carbon atoms, X represents a hydrogen atom or a methyl group, and q represents an integer of 5 or less; aromatic series organic solvents, such as toluene and xylene; and mono- or di-isobutyrate of 2,2,4-trimethyl-1,3-pentanediol, 3-methoxybutanol, 3-methoxybutanol acetate, 3-methyl-3-methoxybutanol and 3-methyl-3-methoxybutanol acetate.

Next, an exemplary method of manufacturing the aqueous coating material of the present invention is described.

The aqueous coating material of the present invention is obtained by mixing colloidal silica (II) and nonionic surfactant (III) with an HLB value of 16 or more with a dispersion liquid of polymer (I).

The polymer (I) is obtained by emulsion polymerization of monomer mixture (M) by a publicly known method.

As an initiator, any of those commonly used in radical polymerization is available. Examples of the initiator include persulfates, such as potassium persulfate, sodium persulfate, and ammonium persulfate; oil-soluble azo compounds, such as azobisisobutyronitrile, 2,2'-azobis(2-methyl butyronitrile), 2,2'-azobis(2,4-dimethyl valeronitrile), 2,2'-azobis(4-methoxy-2,4-dimethyl valeronitrile), and 2-phenylazo4-methoxy-2,4-dimethyl valeronitrile; water-soluble azo compounds, such as 2,2'-azobis{2-methyl-N[1,1-bis(hydroxymethyl)-2-hydroxyethyl]propionamide}, 2,2'-azobis {2-methyl-N-[2-(1-hydroxyethyl)]propionamide}, 2,2'-azobis {2-methyl-N-[2-(1-hydroxybutyl)]propionamide}, 2,2'-azobis[2-(5-methyl-2-imidazolin-2-yl)propane] and salts thereof, 2,2'-azobis[2-(2-imidazolin-2-yl)propane] and salts thereof, 2,2'-azobis[2-(3,4,5,6-tetrahydro pyrimidin-2-yl) propane] and salts thereof, 2,2'-azobis (1-imino-1-pyrrolidino-2-methylpropane) and salts thereof, 2,2'-azobis{2-[1-(2-hydroxyethyl)-2-imidazolin-2-yl]propane} and salts thereof, 2,2'-azobis (2-methyl propione amidine) and salts thereof, and 2,2'-azobis[N-(2-carboxyethyl)-2-methyl propione amidine] and salts thereof; and organic peroxides, such as benzoyl peroxide, cumene hydroperoxide, t-butyl hydroperoxide, t-butylperoxy-2-ethyl hexanoate, and t-buthyl peroxy isobuthylate.

These initiators may be used alone, or may be used in combination of two or more.

Furthermore, when acceleration of polymerization rate and polymerization at a low temperature of 70° C. or less are desired, it is profitable that water soluble azo compounds such as 2,2'-azobis[2-(2-imidazolin-2-yl)propane] and salts thereof having a 10-hour half-life temperature of 70° C. or less or reducing agents such as sodium bisulphite, ferrous sulfate, ascorbate, and Rongalite are used in combination with radical polymerization catalysts.

From the viewpoint of the storage stabilities of aqueous coating materials and paints, combinations of organic peroxides, such as t-butyl hydroperoxide and reducing agents, such as ferrous sulfate and ascorbate are preferable.

The amount of the radical polymerization initiator added is usually 0.01 to 10 parts by mass with respect to 100 parts by mass of the polymer (I). However, it is preferably 0.02 to 5 parts by mass in consideration of the progress of polymerization and the control of reaction.

When adjusting the molecular weight of the polymer (I), a publicly known chain transfer agent may be used as a molecular weight regulator. Examples of the known chain transfer agent include mercaptans, such as n-dodecyl mercaptan, t-dodecyl mercaptan, n-octyl mercaptan, n-tetradecyl mercaptan, and n-hexyl mercaptan; halogenated compounds, such as carbon tetrachloride and ethylene bromide; and α-methyl styrene dimer. The amount of the molecular weight regulator used is 1 part by mass or less with respect to 100 parts by mass of the polymer (I).

In a dispersion liquid of the polymer (I) obtained by emulsion polymerization, the pH of this system is preferably adjusted within a range of neutral and weak alkaline region, or approximately pH 6.5 to 11.0 by addition of a basic compound after the polymerization. Thus, the stability of the emulsion obtained can be improved.

Examples of the basic compound include ammonia, triethylamine, propylamine, dibutyl amine, amylamine, 1-aminooctane, 2-dimethyl aminoethanol, ethylamino ethanol, 2-diethyl aminoethanol, 1-amino-2-propanol, 2-amino-1-propanol, 2-amino-2-methyl-1-propanol, 3-amino-1-propanol, 1-dimethyl amino-2-propanol, 3-dimethyl amino-1-propanol, 2-propyl aminoethanol, ethoxy propylamine, aminobenzyl alcohol, morpholine, sodium hydroxide, and potassium hydroxide.

In the present invention, furthermore, the polymerization of the monomer mixture (M) is preferably performed in an aqueous dispersion liquid containing a polyorganosiloxane polymer.

The polyorganosiloxane polymer can be synthesized using any of the following compounds as a raw material: dimethyl dialkoxysilanes, such as dimethyl dimethoxysilane and dimethyl diethoxysilane; dimethyl siloxane-cyclic oligomers, such as hexamethyl cyclotrisiloxane, octamethyl cyclotetrasiloxane, decamethyl cyclopentasiloxane, dodecamethyl cyclohexasiloxane, tetradecamethyl cycloheptasiloxane, dimethylcyclics (mixture of trimer to heptanomer dimethyl siloxane-cyclic oligomers); and dimethyldichloro silane. The dimethyl siloxane-cyclic oligomer is preferably used in terms of cost effectiveness as well as the performance, such as heat stability, of the resin obtained. Furthermore, to improve the transparency of the coating film obtained, it is more preferable to copolymerize hydrolyzable silyl group-containing radically polymerizable monomers. The mass average molecular weight of the polyorganosiloxane polymer is preferably 10,000 or more, and more preferably 50,000 or more. When the polyorganosiloxane polymer has a mass average molecular weight of 10,000 or more, the coating film obtained can easily exert sufficient weather resistance. The content of the polyorganosiloxane polymer used is preferably 0.3 to 50 parts by mass, and more preferably 0.5 to 30 parts by mass in the monomer mixture (M) in terms of stain resistance and weather resistance.

Furthermore, the nonionic surfactant (III) may be added when the polymer (I) is polymerized or may be added after polymerization of the polymer (I).

The aqueous coating material of the present invention can be used to form a film on any of various articles (hereinafter, referred to as "substrates") to give a painted article.

Examples of the substrate include a cement mortar, a slate plate, a plaster board, an extrusion-molding board, a foamed concrete, a metal, a glass, a porcelain tile, asphalt, wood, a waterproofing rubber material, plastics, a calcium silicate substrate, a PVC sheet, and a FRP (Fiber Reinforced Plastics) substrate.

Specific examples of the painted article produced by applying the aqueous coating material of the present invention include building materials, building exterior, building interior, window frames, window glasses, structural elements, boards, exterior parts of vehicles, exterior parts of mechanical devices and products, solar cell covers, tents, and PVC greenhouses.

A method of applying the aqueous coating material to the surface of each substrate may be suitably selected from various coating methods, such as a spray-coating method, a roller-coating method, a bar-coating method, an air-knife-coating method, a brush-painting method, and a dip-coating method.

After application, the aqueous coating material is dried at ordinary temperature or by heating at a temperature of 40 to 200° C. to obtain a coating film.

After forming a coating film by drying at ordinary temperature or at a low temperature of 50° C. or less, the coating film is heated at a temperature equal to or more than the glass transition temperature of the polymer (I) to obtain the coating film having more excellent weather resistance.

EXAMPLES

Hereinafter, examples of the present invention are described. In the examples, "part(s)" means "part(s) by mass".

Aqueous coating materials were evaluated by methods described below.
[Production of Test Panels for Evaluation of Water Contact Angle, Weather Resistance, and Blister Resistance]

Each paint was applied to a steel sheet treated with zinc phosphate (a steel sheet treated with "Bondelite #100", 0.8 mm in plate thickness, 150 mm in length, and 70 mm in width) with a bar coater #48 under an atmospheric temperature of 40° C. and then dried at 130° C. for 5 minutes. Afterwards, the plate dried at room temperature for 1 day was used as a coated plate for evaluation of water contact angle, weather resistance and blister resistance.
[Production of Test Panels for Evaluation of Storage Stability]

Each paint was placed and sealed in a glass bottle, and the glass bottle was immersed in warm water at 50° C. for 10 days and then cooled to room temperature, followed by being served as a paint for evaluating the storage stability of the paint.

The evaluation paint was applied to a steel sheet treated with zinc phosphate (a steel sheet treated with "Bondelite #100", 0.8 mm in plate thickness, 150 mm in length, and 70 mm in width) with a bar coater #48 under an atmospheric temperature of 40° C. and then dried at 130° C. for 5 minutes. Afterwards, the plate dried at room temperature for 1 day was used as a coated plate for evaluation of storage stability.
[Evaluation method]
(1) Water Contact Angle A water droplet of 0.4 µl (scale graduated in a screen; scale 3) was dropped onto a coated plate for evaluation, and water contact angle after 30 seconds was measured using a CA-X150 type FACE contact angle meter (manufactured by Kyowa Interface Science Co., Ltd.). When the water contact angle is 70° or less, the surface of the coating film obtained shows hydrophilicity and is able to exert its stain resistance by self-purification effect with rain water. When the water contact angle is 40° or less, an effect of further improvement in stain resistance can be exerted.

(2) Weather Resistance

An evaluation test panel was cut into a size of 70 mm in length and 50 mm in width, and then placed in a Daipla Metal Weather, model KU-R4-W (manufactured by Daipla Wintes Co., Ltd.). Then, 60° gloss retention rates after 480 hours (60 cycles), 600 hours (75 cycles), 730 hours (90 cycles), and 840 hours (105 cycles) were used as indexes of weather resistance and the evaluation of weather resistance was then performed under the conditions of testing cycle for 4 hour's irradiation (atomization 5 seconds/15 minutes)/4 hour's dew formation, UV strength of 85 mW/cm², black-panel temperature of 63° C. at irradiation time/30° C. at dew formation time, and humidity of 50% RH at irradiation time/96% RH at dew formation time.

Weather resistance was determined using the following criteria:

"a": 90% or more;
"b": 70 or more but less than 90%;
"c": 50% or more but less than 70%; and
"d": 50% or less, or peeling/crack of the coating film occurred.

(3) Storage Stability

The water contact angle of the coating film on the evaluation test panel was measured and determined with reference to the following criteria:

"a": less than 10° increase in measured value relative to initial water contact angle;
"b": 10° or more but less than 25° increase in measured value relative to initial water contact angle;
"c": 15° or more but less than 30° increase in measured value relative to initial water contact angle; and
"d": 30° or more increase in measured value relative to initial water contact angle.

(4) Blister Resistance

The coated plate for evaluation was immersed in warm water at 50° C. for 72 hours, and then, immediately after pulling up, the coating film appearance was determined based on the ASTM-D714 method's criteria. In Tables 1 to 3, each case with no blister generation is marked "ND", while each case with blister generation is marked with its rating.

(5) Freeze-Thaw Resistance

The degrees of freeze-thaw resistance of the coated plate after 200 and 300 cycles were determined based on the following criteria by the ASTM-C666A method:

"a": no crack and no gloss change;
"b": no crack but slightly decreased gloss, or minor crack generated on only end portion;
"c": minor crack generated on the whole; and
"d": remarkable crack generated on the whole.

Production Example 1

Preparation of Aqueous Dispersion of Polyorganosiloxane Polymer

A raw material composition described below was premixed by a homomixer and emulsified compulsively with pressure of 200 kg/cm² using a pressure-type homogenizer to obtain pre-emulsion of raw materials.

Subsequently, water (90 parts) and dodecylbenzene sulfonic acid (10 parts) were placed in a flask equipped with an agitator, a reflux-cooling pipe, a thermal control unit, and a dropping pump. While keeping the inner temperature of the flask at 85° C. under agitation, the above pre-emulsion of raw materials was added dropwise to the flask over 4 hours. After dropwise addition, the polymerization of the mixture was further allowed to proceed for 1 hour and the flask was then cooled. After that, an aqueous sodium hydroxide solution described below was added to the flask to prepare an aqueous dispersion of polyorganosiloxane copolymer (SiEm). The solid content in the resulting dispersion was 18% by mass.

Raw Material Composition:

| | |
|---|---|
| Mixture of a tremer to heptamer of cyclic dimethyl sioxane oligomer | 98 parts |
| γ-Methacryloyl oxypropyl methyl dimethoxysilane | 2 parts |
| Deionized water | 310 parts |
| Sodium dodecylbenzenesulfonate | 0.7 parts |
| Aqueous sodium hydroxide solution: | |
| Sodium hydroxide | 1.5 parts |
| Deionized water | 30 parts |

Production Example 2

Production (1) of pH-Adjusted Solution of Surfactant having Phosphoric Acid

A surfactant having a phosphoric acid structure, PLYSURF AL (trade name, manufactured by Dai-ichi Kogyo Seiyaku Co., Ltd., 100% in solid content), was adjusted to pH 8 with 28% aqueous ammonia. Subsequently, deionized water was added to the surfactant to give a solid content of 30%. Consequently, a pH-adjusted solution (IV-1) of surfactant having phosphoric acid was obtained.

Production Example 3

Production (2) of pH-Adjusted Solution of Surfactant having Phosphoric Acid

A surfactant having a phosphoric acid structure, PLYSURF AL-12H (trade name, manufactured by Dai-ichi Kogyo Seiyaku Co., Ltd., 100% in solid content), was adjusted to pH 8 with 28% aqueous ammonia. Subsequently, deionized water was added to the surfactant to give a solid content of 30%. Consequently, a pH-adjusted solution (IV-2) of surfactant having phosphoric acid was obtained.

Example 1

A first raw material mixture described below was placed in a flask equipped with an agitator, a reflux-cooling pipe, a thermal control unit, and a dropping pump, and the inner temperature of the flask was then heated to 40° C. Subsequently, an aqueous reducing agent solution described below was added to the flask. Furthermore, after confirming a peak-top temperature due to polymerization heat generation, the inner temperature of the flask was kept at 75° C.

First Raw-Material Mixture:

| | |
|---|---|
| SiEm | 5 parts |
| | (solid content: 0.9 parts) |
| Monomer mixture (m1) | |
| Methyl methacrylate | 13.5 parts |
| N-butyl methacrylate | 1.6 parts |
| 2-Ethylhexyl acrylate | 9.9 parts |
| Glycidyl methacrylate | 3 parts |
| 2-Hydroxyethyl methacrylate | 1 part |
| Monomer (a) triallyl cyanurate | 1 part |
| Anionic surfactant (IV): NEWCOL 707SF | 4.2 parts |

-continued

| | |
|---|---|
| (trade name, manufactured by Nippon Nyukazai Co., Ltd., nonreactive anionic surfactant, solid content: 30%) | (solid content: 1.25 parts) |
| Deionized water | 88% |
| Initiator: Perbutyl H69 (manufactured by Nippon Oils & Fats Co., Ltd.) | 0.02 parts |
| Aqueous reducing agent solution: | |
| Ferrous sulfate | 0.0002 parts |
| Ethylenediaminetetraacetic acid (EDTA) | 0.0005 parts |
| Sodium ascorbate | 0.12 parts |
| Deionized water | 6 parts |

Subsequently, after 0.5 hours from addition of the aqueous reducing agent solution, a second raw material mixture (previously emulsified and dispersed pre-emulsion) containing monomer mixture (m2) and an aqueous initiator solution described below were added dropwise to the flask from different places over 1.7 hours, respectively. The inner temperature of the flask was kept at 75° C. during the dropping, and the flask was kept at 75° C. for 1.5 hours after the dropping.
Second Raw Material Mixture:

| | |
|---|---|
| Monomer mixture (m2) | |
| Methyl methacrylate | 31.5 parts |
| N-butyl methacrylate | 14.5 parts |
| 2-Ethylhexyl acrylate | 20.83 parts |
| Diacetone acrylamide | 1.5 parts |
| Acrylic acid | 1.67 parts |
| Anionic surfactant (IV): NEWCOL 707SF | 4.2 parts |
| | (solid content: 1.25 parts) |
| Deionized water | 25 parts |
| Aqueous initiator solution: | |
| Initiator: Perbutyl H69 | 0.03 part |
| Deionized water | 5 parts |

Then, the flask was cooled to room temperature. After addition of 28% aqueous ammonia (1.4 parts) to the flask, the following raw materials were added sequentially to the flask to obtain an aqueous coating material.
Aqueous Dispersion of Adipic Acid Dihydrazide:

| | |
|---|---|
| Adipic acid dihydrazide | 0.7 parts |
| Deionized water | 1.5 parts |
| Aqueous surfactant solution: | |
| Nonionic surfactant (III): EMULGEN 1150S-60 | 0.83 parts |
| (trade name, 60% in solid content, manufactured by Kao Corporation) | (solid content: 0.5 parts) |
| Deionized water | 0.83 parts |
| Aqueous colloidal silica (II) dispersion: | |
| SNOWTEX NS (trade name, manufactured by Nissan Chemical Industries, Ltd., 20% $SiO_2$ in solid content) | 25 parts |
| | (solid content: 5 parts) |

Furthermore, Butyl Cellosolve (10 parts) was added as a film-forming auxiliary to the obtained aqueous coating material to give a paint.

Examples 2 to 9, Examples 22 to 31

Aqueous coating materials were obtained in a manner similar to Example 1, except that the types and the amounts of the monomer mixture (m1), monomer mixture (m2), and surfactants added were changed as represented in Tables 1 to 3.

Furthermore, Butyl Cellosolve (10 parts) was added as a film-forming auxiliary to the obtained aqueous coating material to give a paint.

Examples 13 to 21

The amounts of the monomer mixture (m1), monomer mixture (m2), and surfactants added and the amount of 28% aqueous ammonia added for final neutralization were changed as represented in Tables 1 to 3, respectively. Furthermore, aqueous coating materials were obtained in a manner similar to Example 1, except that 0.115 parts of AMP-90 was added as a second raw material mixture without addition of aqueous dispersion of adipic acid dihydrazide.

Furthermore, Butyl Cellosolve (10 parts) was added as a film-forming auxiliary to the obtained aqueous coating material to give a paint.

Example 10

A first raw material mixture described below was placed in a flask equipped with an agitator, a reflux-cooling pipe, a thermal control unit, and a dropping pump, and the inner temperature of the flask was then heated to 50° C. Subsequently, a first aqueous initiator solution described below was added to the flask, and additionally an aqueous reducing agent solution described below was added to the flask. Furthermore, after confirming a peak-top temperature due to polymerization heat generation, the inner temperature of the flask was kept at 65° C. After 1 hour from addition of the aqueous reducing agent solution, an aqueous surfactant solution described below was added.
First Raw Material Mixture:

| | |
|---|---|
| SiEm | 5 parts |
| | (solid content: 0.9 parts) |
| Monomer mixture (m1) | |
| Methyl methacrylate | 26.9 parts |
| 2-Hydroxyethyl methacrylate | 2 parts |
| Monomer (a) Ethylene glycol dimethacrylate | 0.1 parts |
| Triallyl cyanurate | 1 part |
| Anionic surfactant (IV) NEWCOL 707SF | 2.5 parts |
| | (solid content: 0.75 parts) |
| Deionized water | 80 parts |
| First aqueous initiator solution: | |
| Initiator: Ammonium persulfate | 0.15 parts |
| Deionized water | 1 part |
| Aqueous reducing agent solution: | |
| Sodium hydrogensulfite | 0.05 parts |
| Deionized water | 1 part |
| Aqueous surfactant solution: | |
| Nonionic surfactant (III): | 1.17 parts |
| EMULGEN 1150S-60 | (solid content: 0.7 parts) |
| Deionized water | 1.17 parts |

Subsequently, after 0.5 hours from addition of the aqueous surfactant solution to the flask, a second raw material mixture (previously emulsified and dispersed pre-emulsion) containing monomer mixture (m2) and a second aqueous initiator solution described below were added dropwise in two series to the flask from different places over 1.5 hours, respectively. The inner temperature of the flask was kept at 65° C. during the dropping, and the flask was kept at 65° C. for 1.5 hours after the dropping.

Second Raw Material Mixture:

Monomer mixture (m2)

| | |
|---|---|
| Methyl methacrylate | 21 parts |
| N-butyl methacrylate | 28.33 parts |
| 2-Ethylhexyl acrylate | 19 parts |
| Acrylic acid | 1.67 parts |
| Anionic surfactant (IV) NEWCOL 707SF | 10 parts |
| | (solid content: 3 parts) |
| Deionized water | 27 parts |
| AMP-90 (90% aqueous solution of 2-amino-2-methyl-1-propanol) | 0.115 parts |

Second aqueous initiator solution:

| | |
|---|---|
| Initiator: VA-061 (manufactured by Wako Pure Chemical Industries, Ltd.) | 0.1 parts |
| Methanol | 2 parts |
| Deionized water | 3 parts |

Subsequently, 28% aqueous ammonia (1.33 parts) was added to the flask and successively kept at 65° C. for 0.5 hours. Subsequently, after cooling to room temperature, an aqueous colloidal silica (II) dispersion described below was added to the flask to give an aqueous coating material.

| | |
|---|---|
| Aqueous colloidal silica (II) dispersion: | 25 parts |
| SNOWTEX NS | (solid content: 5 parts) |

Furthermore, Butyl Cellosolve (10 parts) was added as a film-forming auxiliary to the obtained aqueous coating material to give a paint.

Examples 11 and 12

Aqueous coating materials were obtained in a manner similar to Example 10, except that the amounts of the "SiEm" and the "colloidal silica (II)" added were changed as represented in Tables 1 to 3, respectively.

Furthermore, Butyl Cellosolve (10 parts) was added as a film-forming auxiliary to the obtained aqueous coating material to give a paint.

TABLE 1

| | | | | | Example 1 | Example 2 | Example 3 | Example 4 | Example 5 | Example 6 |
|---|---|---|---|---|---|---|---|---|---|---|
| Polymer (I) | | | SIEm (Solid content) | | 0.9 | 0.9 | 0.9 | 0.9 | 0.9 | 0.9 |
| | Monomer mixture (M) | Monomer mixture (m1) | Monomer (a) | TAC | 1 | 1 | 1 | | | |
| | | | | TAIC | | | | 1 | | |
| | | | | DATP | | | | | 1 | |
| | | | | AMA | | | | | | 1 |
| | | | | EDMA | | | | | | |
| | | | Other monomer | MMA | 13.5 | 13.5 | 13.5 | 13.5 | 13.5 | 13.5 |
| | | | | n-BMA | 1.6 | 1.6 | 1.6 | 1.6 | 1.6 | 1.6 |
| | | | | 2-EHA | 9.9 | 9.9 | 9.9 | 9.9 | 9.9 | 9.9 |
| | | | | CHMA | | | | | | |
| | | | | GMA | 3 | 3 | 3 | 3 | 3 | 3 |
| | | | | 2-HEMA | 1 | 1 | 1 | 1 | 1 | 1 |
| | | | | Glass transition temperature calculated from the FOX equation (° C.) | 22 | 22 | 22 | 22 | 22 | 22 |
| | | Monomer mixture (m2) | | MMA | 31.5 | 31.5 | 31.5 | 31.5 | 31.5 | 31.5 |
| | | | | CHMA | | | | | | |
| | | | | n-BMA | 14.5 | 14.5 | 14.5 | 14.5 | 14.5 | 14.5 |
| | | | | 2-EHA | 20.83 | 20.83 | 20.83 | 20.83 | 20.83 | 20.83 |
| | | | | DAAM | 1.5 | 1.5 | 1.5 | 1.5 | 1.5 | 1.5 |
| | | | | AA | 1.67 | 1.67 | 1.67 | 1.67 | 1.67 | 1.67 |
| | | | | MAA | | | | | | |
| | | | | Glass transition temperature calculated from the FOX equation (° C.) | 22 | 22 | 22 | 22 | 22 | 22 |
| | Average particle size of polymer (I) (nm) | | | | 113 | 115 | 113 | 119 | 121 | 112 |
| | Colloidal silica (II) | | SNOWTEX NS (Solid content) | | 5 | 5 | 5 | 5 | 5 | 5 |
| Surfactant | Nonionic (III) | HLB of 16 or more | EMULGEN 1150S-60 (Solid content) | | 0.5 | | | 0.5 | 0.5 | 0.5 |
| | | | EMULGEN 1135S-70 (Solid content) | | | 0.5 | | | | |
| | | | EMULGEN 1118S-70 (Solid content) | | | | 0.5 | | | |
| | | HLB of less than 16 | ADEKA REASOAP NE-10 (Solid content) | | | | | | | |
| | | | EMULGEN 1108 (Solid content) | | | | | | | |
| | Anionic (IV) | First stage | NEWCOL 707SF (Solid content) | | 1.25 | 1.25 | 1.25 | 1.25 | 1.25 | 1.25 |
| | | | PLYSURF AL (Solid content, IV-1) | | | | | | | |
| | | | PLYSURF AL-12H (Solid content, IV-2) | | | | | | | |
| | | Second stage | NEWCOL 707SF (Solid content) | | 1.25 | 1.25 | 1.25 | 1.25 | 1.25 | 1.25 |
| | | | PLYSURF AL (Solid content, IV-1) | | | | | | | |
| | | | PLYSURF AL-12H (Solid content, IV-2) | | | | | | | |

TABLE 1-continued

| Additive | | | 28% aqueous ammonia | 1.4 | 1.4 | 1.4 | 1.4 | 1.4 | 1.4 |
|---|---|---|---|---|---|---|---|---|---|
| | Evaluation results | | Water contact angle (degree) | 16 | 39 | 55 | 18 | 30 | 42 |
| | | | Weather resistance (DMW/840 h) | — | — | — | — | — | — |
| | | | Weather resistance (DMW/720 h) | a | b | c | a | b | b |
| | | | Weather resistance (DMW/600 h) | a | a | b | a | a | a |
| | | | Weather resistance (DMW/480 h) | — | — | — | — | — | — |
| | | | Storage stability | a | a | a | a | a | a |
| | | | Blister resistance | ND | ND | ND | ND | ND | ND |
| | | | Freeze-thaw resistance (300 cycles) | | | | | | |
| | | | Freeze-thaw resistance (200 cycles) | | | | | | |

| | | | | | Example 7 | Example 8 | Example 9 | Example 10 |
|---|---|---|---|---|---|---|---|---|
| Polymer (I) | | | SIEm (Solid content) | | 0.9 | 0.9 | 0.9 | 0.9 |
| | Monomer mixture (M) | Monomer mixture (m1) | Monomer (a) | TAC | | 0.5 | | 1 |
| | | | | TAIC | | | | |
| | | | | DATP | | | | |
| | | | | AMA | | | | |
| | | | | EDMA | 1 | | 5 | 0.1 |
| | | | Other monomer | MMA | 13.5 | 14 | 9.5 | 26.9 |
| | | | | n-BMA | 1.6 | 1.6 | 1.6 | |
| | | | | 2-EHA | 9.9 | 9.9 | 9.9 | |
| | | | | CHMA | | | | |
| | | | | GMA | 3 | 3 | 3 | |
| | | | | 2-HEMA | 1 | 1 | 1 | 2 |
| | | | Glass transition temperature calculated from the FOX equation (° C.) | | 22 | 21 | 10 | 101 |
| | | Monomer mixture (m2) | MMA | | 31.5 | 31.5 | 31.5 | 21 |
| | | | CHMA | | | | | |
| | | | n-BMA | | 14.5 | 14.5 | 14.5 | 28.33 |
| | | | 2-EHA | | 20.83 | 20.83 | 20.83 | 19 |
| | | | DAAM | | 1.5 | 1.5 | 1.5 | |
| | | | AA | | 1.67 | 1.67 | 1.67 | 1.67 |
| | | | MAA | | | | | |
| | | | Glass transition temperature calculated from the FOX equation (° C.) | | 22 | 22 | 22 | 14 |
| | Average particle size of polymer (I) (nm) | | | | 113 | 121 | 110 | 152 |
| Colloidal silica (II) | | | SNOWTEX NS (Solid content) | | 5 | 5 | 5 | 5 |
| Surfactant | Nonionic (III) | HLB of 16 or more | EMULGEN 1150S-60 (Solid content) | | 0.5 | 0.5 | 0.5 | 0.7 |
| | | | EMULGEN 1135S-70 (Solid content) | | | | | |
| | | | EMULGEN 1118S-70 (Solid content) | | | | | |
| | | HLB of less than 16 | ADEKA REASOAP NE-10 (Solid content) | | | | | |
| | | | EMULGEN 1108 (Solid content) | | | | | |
| | Anionic (IV) | First stage | NEWCOL 707SF (Solid content) | | 1.25 | 1.25 | 1.25 | 0.75 |
| | | | PLYSURF AL (Solid content, IV-1) | | | | | |
| | | | PLYSURF AL-12H (Solid content, IV-2) | | | | | |
| | | Second stage | NEWCOL 707SF (Solid content) | | 1.25 | 1.25 | 1.25 | 3 |
| | | | PLYSURF AL (Solid content, IV-1) | | | | | |
| | | | PLYSURF AL-12H (Solid content, IV-2) | | | | | |
| Additive | | | 28% aqueous ammonia | | 1.4 | 1.4 | 1.4 | 1.33 |
| | Evaluation results | | Water contact angle (degree) | | 45 | 32 | 35 | 12 |
| | | | Weather resistance (DMW/840 h) | | — | — | — | — |
| | | | Weather resistance | | b | c | c | d |

TABLE 1-continued

|  |  |  |  |  |
|---|---|---|---|---|
| (DMW/720 h) |  |  |  |  |
| Weather resistance (DMW/600 h) | a | b | b | a |
| Weather resistance (DMW/480 h) | — | — | — | a |
| Storage stability | a | a | a | c |
| Blister resistance | ND | ND | ND | — |
| Freeze-thaw resistance (300 cycles) |  |  |  | a |
| Freeze-thaw resistance (200 cycles) |  |  |  | a |

TABLE 2

|  |  |  |  | Example 11 | Example 12 | Example 13 | Example 14 | Example 15 | Example 16 |
|---|---|---|---|---|---|---|---|---|---|
| Polymer (I) |  | SIEm (Solid content) |  | 0 | 0 | 0.9 | 0.9 | 0.9 | 09 |
|  | Monomer mixture (M) | Monomer mixture (m1) | Monomer (a) TAC | 1 | 1 | 1 | 1 | 1 | 1 |
|  |  |  | TAIC |  |  |  |  |  |  |
|  |  |  | DATP |  |  |  |  |  |  |
|  |  |  | AMA |  |  |  |  |  |  |
|  |  |  | EDMA | 0.1 | 0.1 | 0.1 | 0.1 | 0.1 | 0.1 |
|  |  | Other monomer | MMA | 26.9 | 26.9 | 26.9 | 26.9 | 26.9 | 26.9 |
|  |  |  | n-BMA |  |  |  |  |  |  |
|  |  |  | 2-EHA |  |  |  |  |  |  |
|  |  |  | CHMA |  |  |  |  |  |  |
|  |  |  | GMA |  |  |  |  |  |  |
|  |  |  | 2-HEMA | 2 | 2 | 2 | 2 | 2 | 2 |
|  |  |  | Glass transition temperature calculated from the FOX equation (° C.) | 101 | 101 | 101 | 101 | 101 | 101 |
|  |  | Monomer mixture (m2) | MMA | 21 | 21 | 21 | 21 | 21 | 21 |
|  |  |  | CHMA |  |  |  |  |  |  |
|  |  |  | n-BMA | 28.33 | 28.33 | 28.33 | 28.33 | 28.33 | 28.33 |
|  |  |  | 2-EHA | 19 | 19 | 19 | 19 | 19 | 19 |
|  |  |  | DAAM |  |  |  |  |  |  |
|  |  |  | AA | 1.67 | 1.67 | 1.67 | 1.67 | 1.67 | 1.67 |
|  |  |  | MAA |  |  |  |  |  |  |
|  |  |  | Glass transition temperature calculated from the FOX equation (° C.) | 14 | 14 | 14 | 14 | 14 | 14 |
|  |  | Average particle size of polymer (I) (nm) |  | — | — | 72 | 89 | 118 | 135 |
|  | Colloidal silica (II) |  | SNOWTEX NS (Solid content) | 5 | 15 | 5 | 5 | 5 | 5 |
| Surfactant | Nonionic (III) | HLB of 16 or more | EMULGEN 1150S-60 (Solid content) | 0.7 | 0.7 | 1 | 1 | 1 | 1 |
|  |  |  | EMULGEN 1135S-70 (Solid content) |  |  |  |  |  |  |
|  |  |  | EMULGEN 1118S-70 (Solid content) |  |  |  |  |  |  |
|  |  | HLB of less than 16 | ADEKA-REASOAP NE-10 (Solid content) |  |  |  |  |  |  |
|  |  |  | EMULGEN 1108 (Solid content) |  |  |  |  |  |  |
|  | Anionic (IV) | First stage | NEWCOL 707SF (Solid content) | 0.75 | 0.75 | 3 | 2.3 | 1.3 | 1.1 |
|  |  |  | PLYSURF AL (Solid content, IV-1) |  |  |  |  |  |  |
|  |  |  | PLYSURF AL-12H (Solid content, IV-2) |  |  |  |  |  |  |
|  |  | Second stage | NEWCOL 707SF (Solid content) | 3 | 3 | 1 | 1.2 | 2.2 | 2.4 |
|  |  |  | PLYSURF AL (Solid content, IV-1) |  |  |  |  |  |  |
|  |  |  | PLYSURF AL-12H (Solid content, IV-2) |  |  |  |  |  |  |
| Additive |  | 28% aqueous ammonia |  | 1.33 | 1.33 | 1.33 | 1.33 | 1.33 | 1.33 |
|  | Evaluation results |  | Water contact angle (degree) | 23 | 10 | 49 | 30 | 19 | 15 |
|  |  |  | Weather resistance (DMW/840 h) | — | — | — | — | — | — |
|  |  |  | Weather resistance (DMW/720 h) | d | d | b | a | a | b |

TABLE 2-continued

|  |  |  |  |  |  |  |  |  |
|---|---|---|---|---|---|---|---|---|
|  |  | Weather resistance (DMW/600 h) | b | b | b | a | a | a |
|  |  | Weather resistance (DMW/480 h) | a | a | a | a | a | a |
|  |  | Storage stability | c | c | c | c | c | c |
|  |  | Blister resistance | — | — | — | — | — | — |
|  |  | Freeze-thaw resistance (300 cycles) | a | a | b | a | a | a |
|  |  | Freeze-thaw resistance (200 cycles) | a | a | a | a | a | a |

|  |  |  |  |  | Example 17 | Example 18 | Example 19 | Example 20 |
|---|---|---|---|---|---|---|---|---|
| Polymer (I) |  |  | SIEm (Solid content) |  | 09 | 0.9 | 0.9 | 0.9 |
|  | Monomer mixture (M) | Monomer mixture (m1) | Monomer (a) | TAC | 1 | 1 | 1 | 1 |
|  |  |  |  | TAIC |  |  |  |  |
|  |  |  |  | DATP |  |  |  |  |
|  |  |  |  | AMA |  |  |  |  |
|  |  |  |  | EDMA | 0.1 | 0.1 | 0.1 | 0.1 |
|  |  |  | Other monomer | MMA | 26.9 | 26.9 | 26.9 | 26.9 |
|  |  |  |  | n-BMA |  |  |  |  |
|  |  |  |  | 2-EHA |  |  |  |  |
|  |  |  |  | CHMA |  |  |  |  |
|  |  |  |  | GMA |  |  |  |  |
|  |  |  |  | 2-HEMA | 2 | 2 | 2 | 2 |
|  |  |  |  | Glass transition temperature calculated from the FOX equation (° C.) | 101 | 101 | 101 | 101 |
|  |  | Monomer mixture (m2) |  | MMA | 21 | 20.67 | 17.67 | 14.67 |
|  |  |  |  | CHMA |  |  |  |  |
|  |  |  |  | n-BMA | 28.33 | 28.33 | 28.33 | 28.33 |
|  |  |  |  | 2-EHA | 19 | 19 | 19 | 19 |
|  |  |  |  | DAAM |  |  |  |  |
|  |  |  |  | AA | 1.67 |  | 5 | 8 |
|  |  |  |  | MAA |  | 2 |  |  |
|  |  |  |  | Glass transition temperature calculated from the FOX equation (° C.) | 14 | 15 | 14 | 14 |
|  | Average particle size of polymer (I) (nm) |  |  |  | 156 | 116 | 124 | 129 |
|  | Colloidal silica (II) |  | SNOWTEX NS (Solid content) |  | 5 | 5 | 5 | 5 |
| Surfactant | Nonionic (III) | HLB of 16 or more | EMULGEN 1150S-60 (Solid content) |  | 1 | 1 | 1 | 1 |
|  |  |  | EMULGEN 1135S-70 (Solid content) |  |  |  |  |  |
|  |  |  | EMULGEN 1118S-70 (Solid content) |  |  |  |  |  |
|  |  | HLB of less than 16 | ADEKA-REASOAP NE-10 (Solid content) |  |  |  |  |  |
|  |  |  | EMULGEN 1108 (Solid content) |  |  |  |  |  |
|  | Anionic (IV) | First stage | NEWCOL 707SF (Solid content) |  | 0.8 | 1.3 | 1.3 | 1.3 |
|  |  |  | PLYSURF AL (Solid content, IV-1) |  |  |  |  |  |
|  |  |  | PLYSURF AL-12H (Solid content, IV-2) |  |  |  |  |  |
|  |  | Second stage | NEWCOL 707SF (Solid content) |  | 2.7 | 2.2 | 2.2 | 2.2 |
|  |  |  | PLYSURF AL (Solid content, IV-1) |  |  |  |  |  |
|  |  |  | PLYSURF AL-12H (Solid content, IV-2) |  |  |  |  |  |
| Additive |  | 28% aqueous ammonia |  |  | 1.33 | 1.33 | 3.98 | 6.37 |
|  | Evaluation results |  | Water contact angle (degree) |  | 14 | 65 | 15 | 13 |
|  |  |  | Weather resistance (DMW/840 h) |  | — | — | — | — |
|  |  |  | Weather resistance (DMW/720 h) |  | d | d | c | c |
|  |  |  | Weather resistance (DMW/600 h) |  | b | d | b | b |
|  |  |  | Weather resistance (DMW/480 h) |  | a | b | a | b |

TABLE 2-continued

|  |  |  |  |  |
|---|---|---|---|---|
| Storage stability | c | a | d | d |
| Blister resistance | — | — | — | — |
| Freeze-thaw resistance (300 cycles) | b | c | b | b |
| Freeze-thaw resistance (200 cycles) | b | b | a | b |

TABLE 3

| | | | | | Example 21 | Example 22 | Example 23 | Example 24 | Example 25 | Example 26 |
|---|---|---|---|---|---|---|---|---|---|---|
| Polymer (I) | | | SIEm (Solid content) | | 0.9 | 0.9 | 0.9 | 0.9 | 0.9 | 0.9 |
| | Monomer mixture (M) | Monomer mixture (m1) | Monomer (a) | TAC | 1 | 1 | 1 | 1 | 1 | 1 |
| | | | | TAIC | | | | | | |
| | | | | DATP | | | | | | |
| | | | | AMA | | | | | | |
| | | | | EDMA | 0.1 | | | | | |
| | | | Other monomer | MMA | 26.9 | 25 | 25 | 25 | 25 | 25 |
| | | | | n-BMA | | | | | | |
| | | | | 2-EHA | | | | | | |
| | | | | CHMA | | | | | | |
| | | | | GMA | | 3 | 3 | 3 | 3 | 3 |
| | | | | 2-HEMA | 2 | 1 | 1 | 1 | 1 | 1 |
| | | | | Glass transition temperature calculated from the FOX equation (° C.) | 101 | 96 | 96 | 96 | 96 | 96 |
| | | Monomer mixture (m2) | | MMA | 12.67 | 35 | 23 | 16 | | |
| | | | | CHMA | | | | | 20 | 20 |
| | | | | n-BMA | 28.33 | 31.83 | 40.23 | 40.23 | 36.23 | 32.83 |
| | | | | 2-EHA | 19 | | 3.6 | 10.6 | 10.6 | 14 |
| | | | | DAAM | | 1.5 | 1.5 | 1.5 | 1.5 | 1.5 |
| | | | | AA | 10 | 1.67 | 1.67 | 1.67 | 1.67 | 1.67 |
| | | | | MAA | | | | | | |
| | | | | Glass transition temperature calculated from the FOX equation (° C.) | 14 | 60 | 40 | 22 | 22 | 17 |
| | | Average particle size of polymer (I) (nm) | | | 137 | 109 | 110 | 115 | 112 | 115 |
| | Colloidal silica (II) | | | SNOWTEX NS (Solid content) | 5 | 5 | 5 | 5 | 5 | 5 |
| Surfactant | Nonionic (III) | HLB of 16 or more | | EMULGEN 1150S-60 (Solid content) | 1 | 1 | 1 | 1 | 1 | 1 |
| | | | | EMULGEN 1135S-70 (Solid content) | | | | | | |
| | | | | EMULGEN 1118S-70 (Solid content) | | | | | | |
| | | HLB of less than 16 | | ADEKA REASOAP NE-10 (Solid content) | | | | | | |
| | | | | EMULGEN 1108 (Solid content) | | | | | | |
| | Anionic (IV) | First stage | | NEWCOL 707SF (Solid content) | 1.3 | 0.75 | 0.75 | 0.75 | 0.75 | 0.75 |
| | | | | PLYSURF AL (Solid content, IV-1) | | | | | | |
| | | | | PLYSURF AL-12H (Solid content, IV-2) | | | | | | |
| | | Second stage | | NEWCOL 707SF (Solid content) | 2.2 | 3 | 3 | 3 | 3 | 3 |
| | | | | PLYSURF AL (Solid content, IV-1) | | | | | | |
| | | | | PLYSURF AL-12H (Solid content, IV-2) | | | | | | |
| Additive | | 28% aqueous ammonia | | | 7.96 | 1.4 | 1.4 | 1.4 | 1.4 | 1.4 |
| | Evaluation results | | | Water contact angle (degree) | 20 | 5 | 6 | 7 | 15 | 12 |
| | | | | Weather resistance (DMW/840 h) | — | — | — | — | — | — |
| | | | | Weather resistance (DMW/720 h) | d | a | a | a | a | a |
| | | | | Weather resistance (DMW/600 h) | b | a | a | a | a | a |
| | | | | Weather resistance (DMW/480 h) | b | — | — | — | — | — |

TABLE 3-continued

|  |  |  |  |  |  |  |  |  |
|---|---|---|---|---|---|---|---|---|
|  |  | Storage stability | d | a | a | a | a | d |
|  |  | Blister resistance | — | — | — | — | — | — |
|  |  | Freeze-thaw resistance (300 cycles) | c |  |  |  |  |  |
|  |  | Freeze-thaw resistance (200 cycles) | b |  |  |  |  |  |

|  |  |  |  | Example 27 | Example 28 | Example 29 | Example 30 | Example 31 |
|---|---|---|---|---|---|---|---|---|
| Polymer (I) |  | SIEm (Solid content) |  | 0.9 | 0.9 | 0.9 | 0.9 | 0.9 |
|  | Monomer mixture (M) | Monomer mixture (m1) | Monomer (a) TAC | 1 | 1 | 1 | 1 | 1 |
|  |  |  | TAIC |  |  |  |  |  |
|  |  |  | DATP |  |  |  |  |  |
|  |  |  | AMA |  |  |  |  |  |
|  |  |  | EDMA |  |  |  |  |  |
|  |  | Other monomer | MMA | 13.5 | 14 | 25 | 25 | 25 |
|  |  |  | n-BMA | 9.6 | 11 |  |  |  |
|  |  |  | 2-EHA | 1.4 |  |  |  |  |
|  |  |  | CHMA |  |  |  |  |  |
|  |  |  | GMA | 3 | 3 | 3 | 3 | 3 |
|  |  |  | 2-HEMA | 1 | 1 | 1 | 1 | 1 |
|  |  | Glass transition temperature calculated from the FOX equation (° C.) |  | 52 | 62 | 96 | 96 | 96 |
|  | Monomer mixture (m2) |  | MMA | 31.5 | 31.5 |  |  |  |
|  |  |  | CHMA |  |  | 20 | 20 | 20 |
|  |  |  | n-BMA | 14.5 | 14.5 | 28.3 | 28.3 | 28.3 |
|  |  |  | 2-EHA | 20.83 | 20.83 | 18.5 | 18.5 | 18.5 |
|  |  |  | DAAM | 1.5 | 1.5 | 1.5 | 1.5 | 1.5 |
|  |  |  | AA | 1.67 | 1.67 | 1.7 | 1.7 | 1.7 |
|  |  |  | MAA |  |  |  |  |  |
|  |  | Glass transition temperature calculated from the FOX equation (° C.) |  | 22 | 22 | 11 | 11 | 11 |
|  | Average particle size of polymer (I) (nm) |  |  | 109 | 120 | 135 | 132 | 118 |
|  | Colloidal silica (II) | SNOWTEX NS (Solid content) |  | 5 | 5 | 5 | 5 | 5 |
| Surfactant | Nonionic (III) | HLB of 16 or more | EMULGEN 1150S-60 (Solid content) | 0.5 | 0.5 | 1 | 1 |  |
|  |  |  | EMULGEN 1135S-70 (Solid content) |  |  |  |  |  |
|  |  |  | EMULGEN 1118S-70 (Solid content) |  |  |  |  |  |
|  |  | HLB of less than 16 | ADEKA-REASOAP NE-10 (Solid content) |  |  |  |  |  |
|  |  |  | EMULGEN 1108 (Solid content) |  |  |  |  |  |
|  | Anionic (IV) | First stage | NEWCOL 707SF (Solid content) | 1.25 | 1.25 |  |  | 0.75 |
|  |  |  | PLYSURF AL (Solid content, IV-1) |  |  | 0.75 |  |  |
|  |  |  | PLYSURF AL-12H (Solid content, IV-2) |  |  |  | 0.75 |  |
|  |  | Second stage | NEWCOL 707SF (Solid content) | 1.25 | 1.25 |  |  | 3 |
|  |  |  | PLYSURF AL (Solid content, IV-1) |  |  | 3 |  |  |
|  |  |  | PLYSURF AL-12H (Solid content, IV-2) |  |  |  | 3 |  |
| Additive |  | 28% aqueous ammonia |  | 1.4 | 1.4 | 1.4 | 1.4 | 1.4 |
|  | Evaluation results | Water contact angle (degree) |  | 19 | 18 | 20 | 18 | 20 |
|  |  | Weather resistance (DMW/840 h) |  | — | — | b | b | c |
|  |  | Weather resistance (DMW/720 h) |  | b | c | a | a | a |
|  |  | Weather resistance (DMW/600 h) |  | a | b | a | a | a |
|  |  | Weather resistance (DMW/480 h) |  | — | — | a | c | a |
|  |  | Storage stability |  | a | a | c | c | d |
|  |  | Blister resistance |  | None | 6F | None | None | 6MD |
|  |  | Freeze-thaw resistance (300 cycles) |  |  |  |  |  |  |

TABLE 3-continued

Freeze-thaw resistance (200 cycles)

Abbreviations in Tables 1 to 3 represent the following compounds, respectively. Furthermore, all units in Tables 1 to 3 are "part(s) by mass", except that "glass transition temperature calculated from the FOX equation", "average molecular size of polymer (I)", and "evaluation results".
TAC: triallyl cyanurate
TALC: triallyl isocyanurate
DATP: diallyl terephthalate
AMA: allyl methacrylate
EDMA: ethylene glycol dimethacrylate
MMA: methyl methacrylate
n-BMA: n-butyl methacrylate
2-EHA: 2-ethylhexyl acrylate
CHMA: cyclohexyl methacrylate
GMA: glycidyl methacrylate
2-HEMA: 2-hydroxyethyl methacrylate
DAAm: diacetone acrylamide
AA: acrylic acid
MAA: methacrylic acid
SNOWTEX NS: trade name, manufactured by Nissan Chemical Industries, Ltd., 8 to 11 nm in particle size
EMULGEN 1150S-60: trade name, manufactured by Kao Corporation, HLB: 18.5
EMULGEN 1135S-70: trade name, manufactured by Kao Corporation, HLB: 17.9
EMULGEN 1118S-70: trade name, manufactured by Kao Corporation, HLB: 16.4
ADEKA-REASOAP NE-10: trade name, manufactured by ADEKA Corporation, HLB: 15.3
EMULGEN 1108: trade name, manufactured by Kao Corporation, HLB: 13.4
NEWCOL 707SF: trade name, manufactured by Nippon Nyukazai Co., Ltd.
PLYSURF AL: trade name, manufactured by Dai-ichi Kogyo Seiyaku Co., Ltd.
PLYSURF AL-12H: trade name, manufactured by Dai-ichi Kogyo Seiyaku Co., Ltd.

Comparative Examples 1 to 4

Aqueous coating materials were obtained in a manner similar to Example 1, except that the types and the amounts of the monomer mixture (m1), monomer mixture (m2), and surfactants added were changed as represented in Table 4.
Furthermore, Butyl Cellosolve (10 parts) was added as a film-forming auxiliary to the obtained aqueous coating material to give a paint.

Comparative Example 5

Aqueous coating materials were obtained in a manner similar to Example 10, except that the amounts of the "SiEm" and the "colloidal silica (II)" added were changed as represented in Table 4, respectively.
Furthermore, Butyl Cellosolve (10 parts) was added as a film-forming auxiliary to the obtained aqueous coating material to give a paint.

TABLE 4

| | | | | | Comparative Example 1 | Comparative Example 2 | Comparative Example 3 | Comparative Example 4 | Comparative Example 5 |
|---|---|---|---|---|---|---|---|---|---|
| Polymer (I) | | | SIEm (Solid content) | | 0.9 | 0.9 | 0.9 | 0.9 | 0 |
| | Monomer mixture (M) | Monomer mixture (m1) | Monomer (a) | TAC | 1 | 1 | 0.1 | | 1 |
| | | | | EDMA | | | | 21 | 0.1 |
| | | | Other monomer | MMA | 13.5 | 13.5 | 14.4 | 2.2 | 26.9 |
| | | | | n-BMA | 1.6 | 1.6 | 1.6 | 0.5 | |
| | | | | 2-EHA | 9.9 | 9.9 | 9.9 | 2.3 | |
| | | | | GMA | 3 | 3 | 3 | 3 | |
| | | | | 2-HEMA | 1 | 1 | 1 | 1 | 2 |
| | | | | Glass transition temperature calculated from the FOX equation (°C.) | 22 | 22 | 22 | 22 | 101 |
| | | Monomer mixture (m2) | | MMA | 31.5 | 31.5 | 31.5 | 31.5 | 21 |
| | | | | CHMA | | | | | |
| | | | | n-BMA | 14.5 | 14.5 | 14.5 | 14.5 | 28.33 |
| | | | | 2-EHA | 20.83 | 20.83 | 20.83 | 20.83 | 19 |
| | | | | DAAM | 1.5 | 1.5 | 1.5 | 1.5 | |
| | | | | AA | 1.67 | 1.67 | 1.67 | 1.67 | 1.67 |
| | | | | Glass transition temperature calculated from the FOX equation (°C) | 22 | 22 | 22 | 22 | 14 |
| | | Average particle size of polymer (I) (nm) | | | 115 | 117 | 120 | 115 | — |
| | Colloidal silica (II) | | SNOWTEX NS (Solid content) | | 5 | 5 | 5 | 5 | 30 |
| Surfactant | Nonionic (III) | HLB of 16 or more | EMULGEN 1150S-60 (Solid content) | | | | 0.5 | 0.5 | 0.7 |
| | | HLB of less than 16 | ADEKA-REASOAP NE-10 (Solid content) | | 0.5 | | | | |
| | | | EMULGEN 1108 (Solid content) | | | 0.5 | | | |
| | Anionic (IV) | First stage | NEWCOL 707SF (Solid content) | | 1.25 | 1.25 | 1.25 | 1.25 | 0.75 |
| | | Second stage | NEWCOL 707SF (Solid content) | | 1.25 | 1.25 | 1.25 | 1.25 | 3 |

TABLE 4-continued

|  |  |  | Comparative Example 1 | Comparative Example 2 | Comparative Example 3 | Comparative Example 4 | Comparative Example 5 |
|---|---|---|---|---|---|---|---|
| Additive |  | 28% aqueous ammonia | 1.4 | 1.4 | 1.4 | 1.4 | 1.33 |
|  | Evaluation results | Water contact angle (degree) | 82 | 85 | 77 | 20 | 45 |
|  |  | Weather resistance (DMW/840 h) | — | — | — | — | — |
|  |  | Weather resistance (DMW/720 h) | d | d | d | d | d |
|  |  | Weather resistance (DMW/600 h) | d | d | d | d | d |
|  |  | Weather resistance (DMW/480 h) | — | — | — | — | d |
|  |  | Storage stability | a | a | a | a | c |
|  |  | Blister resistance | 6D | 6D | 6D | 6D | — |
|  |  | Freeze-thaw resistance (300 cycles) |  |  |  |  | d |
|  |  | Freeze-thaw resistance (200 cycles) |  |  |  |  | d |

Abbreviations in Table 4 are the same as those in Tables 1 to 3. Furthermore, all units in Tables 1 to 3 are "part(s) by mass", except that "glass transition temperature calculated from the FOX equation", "average molecular size of polymer (I)", and "evaluation results".

As illustrated in Tables 1 to 4, coating films prepared using the aqueous coating materials of Examples 1 to 31 of the present invention showed good water contact angles, and were excellent in stain resistance and weather resistance.

On the other hand, in contrast to Example 1, the coating films prepared using the aqueous coating materials of Comparative Examples 1 and 2 did not include nonionic surfactant (III) with an HLB value of 16, and the coagulation of colloidal silica was insufficient, resulting in large water contact angle and poor stain resistance. Furthermore, a large amount of colloidal silica was remained in the coating film, so that the coating film had poor weather resistance and blister resistance.

In Comparative Example 3, the amount of monomer having two or more radically polymerizable groups and served as monomer (a) used was insufficient and the coagulation of colloidal silica was insufficient, resulting in large water contact angle and poor stain resistance. Furthermore, a large amount of colloidal silica was remained in the coating film, so that the coating film had poor weather resistance and blister resistance.

In Comparative Example 4, the amount of the monomer (a) used was excess, and the film-forming properties of a coating film was insufficient, so that the coating film had poor weather resistance and blister resistance.

In comparative example 5, the amount of colloidal silica used was excess, so that the coating film had poor weather resistance and blister resistance.

Industrial Applicability

The aqueous coating material of the present invention can exert excellent stain resistance as well as excellent weather resistance. Therefore, the aqueous coating material of the present invention can be used in various coating applications including main part protection of buildings, civil engineering structures, and are very useful in industrial applications.

The invention claimed is:

1. An aqueous coating material, comprising:
a polymer (I);
colloidal silica (II); and
a nonionic surfactant (III) having an HLB value of 16 or more,
wherein the polymer (I) is obtained by a process comprising polymerizing a monomer mixture (M) comprising 0.2 to 10% by mass of monomer (a) comprising 2 or more radically polymerizable groups,
a solid content of the colloidal silica (II) is 0.1 to 20 parts by mass with respect to 100 parts by mass of the polymer (I), and
a content of the nonionic surfactant (III) is 0.01 to 10 parts by mass with respect to 100 parts by mass of the polymer (I).

2. The aqueous coating material of claim 1, wherein the polymer (I) has an average particle size of 80 to 140 nm, and the monomer mixture (M) comprises 0.1 to 9% by mass of acrylic acid.

3. The aqueous coating material of claim 1, wherein the monomer mixture (M) comprises a monomer mixture (m1) that comprises the monomer (a) and a monomer mixture (m2) that does not comprise the monomer (a), the polymerizing comprises, polymerizing the monomer mixture (m1), and then polymerizing the monomer mixture (m2), and
a polymer comprising the monomer mixture (m2) has a glass transition temperature of 20° C. or more calculated from a FOX equation.

4. The aqueous coating material of claim 1, wherein the monomer mixture (M) comprises a monomer mixture (m1) that comprises the monomer (a) and a monomer mixture (m2) that does not comprise the monomer (a),
the polymerizing comprises, polymerizing the monomer mixture (m1), and then polymerizing the monomer mixture (m2), and
a polymer comprising a monomer mixture other than the monomer mixture (ml) has a glass transition temperature of 60° C. or less calculated from a FOX equation.

5. The aqueous coating material of claim 1, further comprising an anionic surfactant comprising a phosphoric acid structure.

6. A painted article obtained by a process comprising contacting an article with a paint comprising an aqueous coating material of claim 1.

7. The aqueous coating material of claim 2, wherein the monomer mixture (M) comprises a monomer mixture (m1) that comprises the monomer (a) and a monomer mixture (m2) that does not comprise the monomer (a),
the polymerizing comprises, polymerizing the monomer mixture (m1), and then polymerizing the monomer mixture (m2), and
a polymer comprising the monomer mixture (m2) has a glass transition temperature of 20° C. or more calculated from a FOX equation.

8. The aqueous coating material of claim 2, wherein the monomer mixture (M) comprises a monomer mixture (m1) that comprises the monomer (a) and a monomer mixture (m2) that does not comprise the monomer (a),
the polymerizing comprises, polymerizing the monomer mixture (m1), and then polymerizing the monomer mixture (m2), and a polymer comprising a monomer mixture other than the monomer mixture (m1) has a glass transition temperature of 60° C. or less calculated from a FOX equation.

9. The aqueous coating material of claim 1, wherein the monomer mixture (M) comprises 0.4% to 10% by mass of monomer (a).

10. The aqueous coating material of claim 1, wherein the monomer mixture (M) comprises 0.2 to 3% by mass of monomer (a).

11. The aqueous coating material of claim 9, wherein the monomer mixture (M) comprises 0.4% to 3% by mass of monomer (a).

12. The aqueous coating material of claim 2, wherein the polymer (I) has an average particle size of 100 to 130 nm 13. The aqueous coating material of claim 1, wherein the solid content of the colloidal silica (II) is 0.5 to 18 parts by mass with respect to 100 parts by mass of the polymer (I).

14. The aqueous coating material of claim 1, wherein the solid content of the colloidal silica (II) is 1 to 10 parts by mass with respect to 100 parts by mass of the polymer (I)

15. The aqueous coating material of claim 1, wherein the colloidal silica (II) has an average particle size of 1 to 60 nm.

16. The aqueous coating material of claim 1, wherein the colloidal silica (II) has an average particle size of less than 40 nm.

17. The aqueous coating material of claim 1, wherein the colloidal silica (II) has an average particle size of less than 20 nm.

18. The aqueous coating material of claim 1, wherein the nonionic surfactant (III) has an HLB value of 17 or more.

19. The aqueous coating material of claim 1, wherein the nonionic surfactant (III) has an HLB value of 18 or more.

20. The aqueous coating material of claim 1, wherein the content of the nonionic surfactant (III) is 0.3 to 5 parts by mass with respect to 100 parts by mass of the polymer (I).

* * * * *